United States Patent [19]

Smith

[11] Patent Number: 5,165,734
[45] Date of Patent: Nov. 24, 1992

[54] CONDUIT SWIVEL CONNECTOR

[75] Inventor: Walter W. Smith, Camarillo, Calif.

[73] Assignee: Smith Precision Products Company, Newbury Park, Calif.

[21] Appl. No.: 754,088

[22] Filed: Sep. 3, 1991

[51] Int. Cl.⁵ .............................................. F16L 27/00
[52] U.S. Cl. .................................... 285/276; 285/281
[58] Field of Search ..................... 285/276, 281, 279

[56] References Cited

U.S. PATENT DOCUMENTS

| 2,836,439 | 5/1958 | Moore | 285/279 |
|---|---|---|---|
| 3,514,127 | 5/1970 | Brooker | 285/276 X |
| 4,254,972 | 3/1981 | Wiedenbeck et al. | 285/279 X |
| 4,296,952 | 10/1981 | McCracken | 285/276 X |
| 4,477,107 | 10/1984 | Ferguson et al. | 285/279 X |
| 4,817,995 | 4/1989 | Deubler et al. | 285/276 X |

FOREIGN PATENT DOCUMENTS 897028 11/1953 Fed. Rep. of Germany ...... 285/279

Primary Examiner—Dave W. Arola
Attorney, Agent, or Firm—Jessup, Beecher & Slehofer

[57] ABSTRACT

The conduit swivel connector consists of a first conduit, adapted to be connected for example to a filler hose, and terminating in a bell-like housing within which resides a nipple with ball bearing rotation permitted between the two. Thus a pair of aligned conduits are provided with relative 360 degree rotation between the nipple and the housing. Leakage of fluid being transmitted through the connector is prevented by a series of sealing faces, one being located on a annular sealing member retained in the housing, which cooperates with a corresponding sealing face on an intermediate floating seal ring. The opposite side of the seal ring is provided also with a sealing face which engages in sealing sliding engagement with an annular face on the end of the nipple. The sealing faces are carefully lapped so that leakage is substantially prevented from the interior of the conduits.

9 Claims, 1 Drawing Sheet

CONDUIT SWIVEL CONNECTOR

BRIEF SUMMARY OF THE INVENTION

A connector or joint designed, for example, to connect an LP Gas filler hose to a delivery nozzle and permit swiveling between the delivery nozzle and the filler hose. The swivel connection enables complete full circle turning about the axis of the nozzle and the hose connection so as to obviate any twisting or kinking of the filler hose in use.

DETAILED DESCRIPTION

Figure 1:
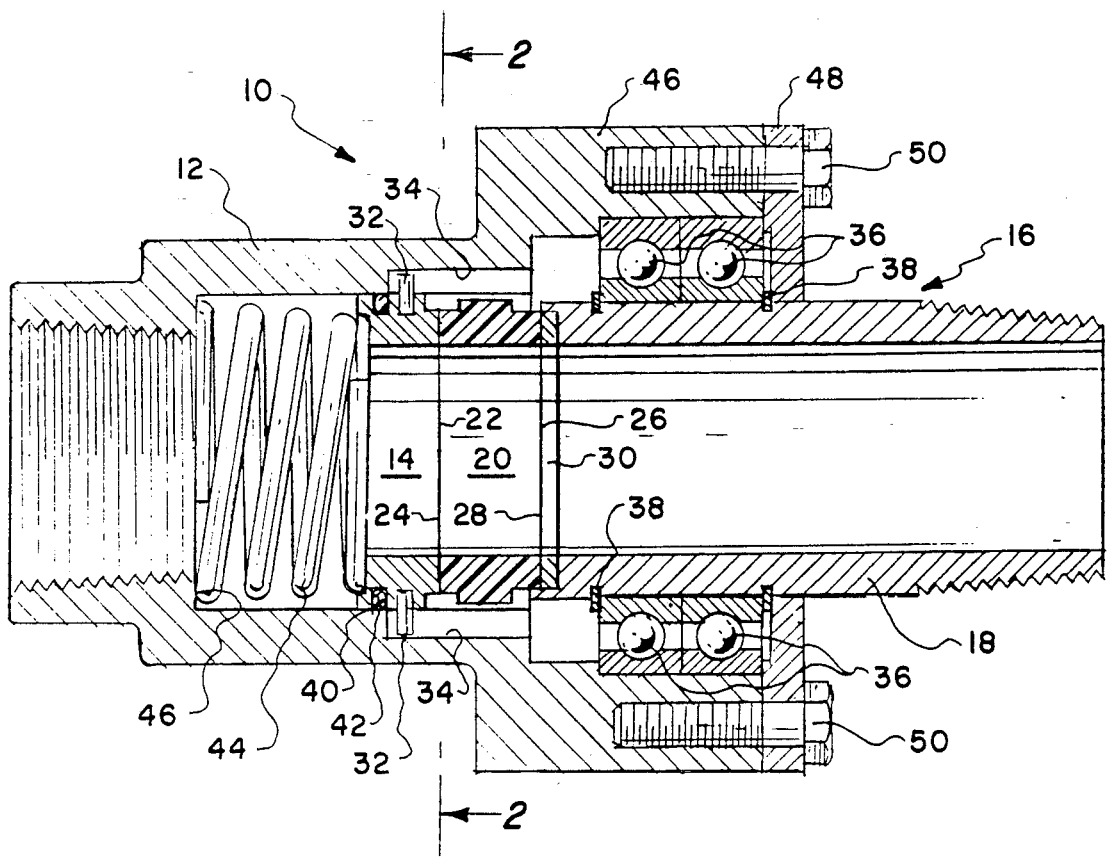
FIG. 1 is a longitudinal sectional view of a conduit swivel illustrating the present invention.
Figure 2:
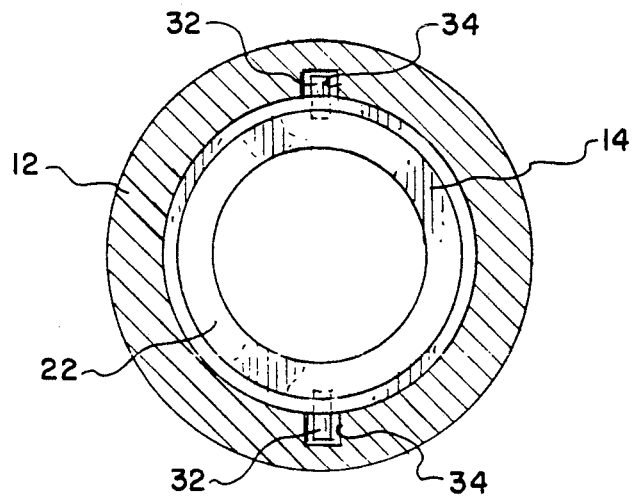
FIG. 2 is a cross section taken on line 2—2 in FIG. 1.

In FIG. 1, 10 is a first conduit means comprising a housing 12 and an annular sealing member 14 therewithin, shown in FIG. 2. The sealing member 14 is in rotative engagement with a coaxially aligned second conduit means 16 consisting of a nipple 18 and a seal ring 20, which floats between the sealing member 14 and the inward facing end of the nipple 18.

The sealing member 14 has an annular sealing face 22 in contiguous sealing and sliding engagement with the annular sealing face 24, on the seal ring 20. On the seal ring 20 opposite from the sealing face 24 the seal ring has another annular sealing face 26 which engages a corresponding annular sealing face 28 on the inner end of the nipple 18. This engagement is also a sliding sealing engagement, through the intermediacy of an annular seating ring 30 fitted into a relief formed on the inward facing end of the nipple 18.

The sealing member 14 is adjustable longitudinally within the housing 12 but is inhibited against rotation therein by a pair of key pins 32 riding in respective keyways 34 formed on the internal diameter of the housing 12.

As seen in FIG. 1, the housing 12 is coaxial with the nipple 18; free rotation, about the axis, between these two members is provided by a double ball bearing 36. The double bearing 36 and the nipple 18 are anchored together by lock rings 38.

The annular sealing member 14 is provided with a circular groove 40 in which is fitted an O-ring 42 which blocks axial passage of fluid from the left end of the housing 12 (connected to the hose) into the interior of the housing. A compression spring 44 compressed between a shoulder 46 formed in the ID of the housing is compressed between the housing 12 and the sealing member 14 to keep the latter continually biased to the right, and cause the sealing faces 22/24, and 26/28 to be maintained in sealing engagement as the nipple 18 rotates within the housing 12. The housing 12 at its right hand end is bell-shaped, as shown at 46, to encompass the nipple 18 and provide an annular space therebetween for the accommodation of the double bearing 36. The nipple 18 and bearing 36 are held against significant axial movement in the housing 12 by a ring-like end plate 48 mounted to the right hand end of the housing 12 by cap screws 50.

OPERATION

In use the left hand end of the housing 12 is secured to a flexible LP gas delivery hose, and a nozzle is threaded onto the right hand end of the nipple 18. In unreeling the hose there is a tendency for the hose to twist, which would kink and disrupt the filling operation were it not for the swivel connection between the nipple 18 and the housing 12. With the swivel connection, however, such twisting is ameliorated and there is no disturbance to the filling operation.

In the filling operation the fluid under pressure flows freely through the internal diameter of the housing 12, the annular sealing member 14, the seal ring 20 into the ID of the nipple 18 and thence into the filler nozzle. There is limited adjusting movement between the annular sealing member 14 and the housing 12. There is virtually no leakage past the OD of the sealing member 14 because of the seal effected by the O-ring 42. As relative rotation between the nipple 18 and the housing 12 takes place there is a corresponding rotative sliding between the annular sealing faces 22/24 and 26/28. These sealing faces are carefully and precisely lapped so as to block leakage radially across the engaging faces. In an ideal situation, for each degree of rotation of the nipple 18 with respect to the housing 12, the intermediate seal ring 20 will absorb half of the rotation, or move ½ degree. This is an ideal situation and is not critical to the present invention.

Sealing pressure at the faces 22/24 and 26/28 is provided by fluid pressure, rightward, against the sealing member 14, and by the spring 44. In some cases, if desired the spring omitted.

In a preferred embodiment of the invention the nipple 18 and end plate 48 are made of 10/18 steel and the cap screws 50 are stainless steel. The housing 12 is made of aluminum, and as shown the bearings consist of dual ball bearings. The floating intermediate seal ring 20 is polyimide Dupont grade SP-211 and the annular sealing member 14 and the seating ring 30 in the end of the nipple 18 are made of gray iron.

I claim:

1. Conduit swivel connector comprising:

first conduit means having a planar first annular sealing face;

a seal ring having a planar second annular sealing face in contiguous sealing engagement with said first sealing face and a planar third annular sealing face opposite to said second annular sealing face; said seal ring being free to rotate without restraint except for the frictional engagement between said ring and said contiguous annular sealing faces;

second conduit means coaxial with said first conduit means and having a planar fourth annular sealing face in contiguous sealing engagement with said third annular sealing face of said seal ring;

bearing means disposed coaxially between said conduit means for enabling relative rotation between said conduit means about the common axis of said conduits.

2. Connector in accordance with claim 1 wherein;
   said first conduit means comprises:
   a first conduit;
   an annular sealing member disposed axially within said first conduit, said planar first sealing face being disposed on said sealing member.

3. Conduit swivel connector comprising:
   first conduit means comprising a first conduit having a first annular sealing face;
   said first conduit means including an annular sealing member disposed axially within said first conduit, said first sealing face being disposed on said sealing member;

a seal ring having a second annular sealing face in contiguous sealing engagement with said first sealing face, and a third annular sealing face opposite to said second annular sealing face;

second conduit means coaxial with said first conduit and having a fourth annular sealing face in contiguous sealing engagement with said third annular sealing face of said seal ring;

said seal ring being capable of radial adjustment and free to rotate without restraint except for the frictional engagement between said ring and said contiguous annular sealing faces;

spring means engaging said first conduit and said sealing member and located therebetween for biasing said sealing faces into sealing engagement;

bearing means disposed coaxially between said conduit means for enabling relative rotation between said conduit means about the common axis thereof.

4. Connector in accordance with claim 3 wherein:

said first conduit is belled at its end, said second conduit residing within the bell of said first conduit, said bearing means comprises an annular bearing between said bell and said second conduit.

5. Conduit swivel connector comprising:

a cylindrical conduit terminating in a housing;

a nipple coaxial with said conduit, disposed in said housing and projecting therefrom;

annular bearing means disposed between said housing and said nipple for enabling rotation therebetween;

an annular sealing member disposed axially within said conduit and having a first sealing face facing toward said nipple;

means for mounting said sealing member for axial movement within said conduit;

a seal ring disposed coaxially between said sealing member and said nipple, and having a second sealing face in contiguous engagement with said first sealing face, and a third sealing face opposite from said second sealing face, and facing toward said nipple; said seal ring being capable of radial adjustment and free to rotate without restraint except for the frictional engagement between said ring and said contiguous annular sealing faces.

said nipple having a fourth sealing face in contiguous engagement with third sealing face;

whereby leakage from said conduits is substantially prevented by the sealing engagement of said faces.

6. Conduit swivel connector comprising:

a first conduit having a first annular sealing face;

an annular sealing member mounted within said first conduit for limited axial movement;

a seal ring having a second annular sealing face in contiguous sealing engagement with said first sealing face and a third annular sealing face opposite to said second annular sealing face, said seal ring being capable of radial adjustment and free to rotate without restraint except for frictional engagement between said ring and said contiguous annular sealing faces;

second conduit means coaxial with said first conduit and having a fourth annular sealing face in contiguous sealing engagement with said third annular sealing face of said seal ring;

bearing means disposed coaxially between said first conduit and said second conduit means for enabling relative rotation therebetween about the common axis.

7. Conduit swivel connector comprising:

a first conduit;

an annular sealing member axially aligned with said first conduit and having a planar first sealing face facing away from said first conduit;

a seal ring having a planar second annular sealing face in contiguous sealing engagement with said planar first sealing face and a planar third annular sealing face opposite to said second annular sealing face, said seal ring being free to rotate without restraint except for the frictional engagement between said ring and said contiguous annular sealing faces;

a second conduit aligned with said first conduit and having a planar fourth sealing face in contiguous engagement with said planar third sealing face, whereby leakage from said conduits is substantially prevented by the sealing engagement of said faces;

bearing means disposed coaxially between said conduits for enabling relative rotation between about the common axis thereof.

8. Conduit swivel connector comprising:

first conduit means having an axis and a first annular sealing face;

a nipple coaxially mounted with respect to said first conduit means and having an inner end facing said first conduit means;

a seal ring disposed coaxially at the inner end of said nipple and having a second annular sealing face in contiguous sealing engagement with said first sealing face, and a third annular sealing face opposite to said second annular sealing face, said nipple having a fourth annular sealing face at the inner end of said nipple in contiguous sealing engagement with said third annular sealing face of said seal ring;

said seal ring being capable of radial adjustment and free to rotate without restraint except for the frictional engagement between said ring and said contiguous annular sealing faces;

bearing means disposed coaxially between said first conduit means and said nipple for enabling relative rotation therebetween about the common axis thereof;

spring means for biasing said sealing faces into sealing engagement.

9. Connector in accordance with claim 8 wherein:

said first conduit means includes an annular sealing member disposed on said axis, said first sealing face being disposed on said sealing member;

said spring means engaging said first conduit means and said sealing member and located therebetween.

* * * * *